(12) United States Patent
Lyndersay et al.

(10) Patent No.: US 8,479,118 B2
(45) Date of Patent: Jul. 2, 2013

(54) SWITCHING SEARCH PROVIDERS WITHIN A BROWSER SEARCH BOX

(75) Inventors: Sean Lyndersay, Mountain View, CA (US); Warren G Stevens, Redmond, WA (US); Benjamin N Truelove, Lynwood, WA (US); Amy Adams Placzkiewicz, Kirkland, WA (US); Sebastien Zimmermann, Seattle, WA (US); Tariq Sharif, Issaquah, WA (US); Eric A Vera, Kirkland, WA (US); Sharon Cohen, Redmond, WA (US); Mike Pell, Woodinville, WA (US); Jonathan A Gass, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 11/953,178

(22) Filed: Dec. 10, 2007

(65) Prior Publication Data
US 2009/0150826 A1 Jun. 11, 2009

(51) Int. Cl.
*G06F 3/048* (2006.01)
*G06F 7/00* (2006.01)
*G06F 17/00* (2006.01)

(52) U.S. Cl.
USPC ............................ 715/809; 707/661

(58) Field of Classification Search
USPC ...................... 715/809; 707/3, 661
See application file for complete search history.

(56) References Cited

U.S. PATENT DOCUMENTS

| | | | |
|---|---|---|---|
| 6,366,906 B1 * | 4/2002 | Hoffman | 1/1 |
| 6,785,670 B1 * | 8/2004 | Chiang et al. | 707/706 |
| 6,807,539 B2 | 10/2004 | Miller et al. | |
| 6,941,296 B2 | 9/2005 | Maeno | |
| 2003/0140120 A1 * | 7/2003 | Hartman | 709/219 |
| 2004/0061720 A1 | 4/2004 | Weber | |
| 2006/0190441 A1 | 8/2006 | Gross et al. | |
| 2007/0088680 A1 * | 4/2007 | Sauve et al. | 707/3 |
| 2007/0180020 A1 | 8/2007 | Woods | |
| 2007/0233646 A1 | 10/2007 | Sauve et al. | |
| 2010/0186038 A1 * | 7/2010 | Thomas et al. | 725/42 |

OTHER PUBLICATIONS

Opera, Opera Press Release: Widgets, BitTorrent, content blocking: Introducing Opera 9 Beta, Published Date: Apr. 20, 2006, Opera, pp. 1-2.*
Robert Vamosi, Opera 9 beta 1 Review, Published Date: Apr. 20, 2006, CNET, pp. 1-6.*
Bauer, "Search and Navigation", Netscape Client UE Group, 2001, pp. 1-10.
"IE7 Search Provider Builder Tool", Eric Lawrence, 2007, p. 1.
"Searching with Internet Explorer 7", Palomar College, 2007, pp. 1-5.

* cited by examiner

*Primary Examiner* — David Phantana Angkool
(74) *Attorney, Agent, or Firm* — Wolfe-SBMC

(57) ABSTRACT

A Web browser includes a quick pick search provider menu that provides a user interface which provides a user with the ability to quickly select a new search provider which appears when the user places focus in the Web browser's search box. In one or more embodiments, the Web browser's search box comprises a native part of the Web browser and is not a search box associated with an installed tool bar. In other embodiments, search box functionality is provided as an extension to the Web browser. Further, various embodiments enable the user to switch between search providers in an easy and intuitive way. Yet other embodiments provide an opportunity for users to switch between search providers using keywords in the search box. Further embodiments enable users to define collections of search providers to which individual searches can be sent.

20 Claims, 11 Drawing Sheets

SWITCHING SEARCH PROVIDERS WITHIN A BROWSER SEARCH BOX

BACKGROUND

Some Web browsers enable users to install multiple different search providers that can be used to conduct searches of the Web. For example, some Web browsers enable a user to install multiple different search providers that are accessible through the browser's search box. Currently, however, switching search providers is not an easy task. A common approach is to expose the search providers through a drop-down menu feature that the user must physically access in order to select a particular search provider. Thus, installed search providers are often hidden in menus that users may not necessarily know about.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a Web browser includes a quick pick search provider menu that provides a user interface which provides a user with the ability to quickly select a new search provider which appears when the user places focus in the Web browser's search box. Further, various embodiments enable the user to switch between search providers in an easy and intuitive way.

Yet other embodiments provide an opportunity for users to switch between search providers using keywords in the search box. Further embodiments enable users to define collections of search providers to which individual searches can be sent.

BRIEF DESCRIPTION OF THE DRAWINGS

The same numbers are used throughout the drawings to reference like features.

DETAILED DESCRIPTION

Overview

In one or more embodiments, a Web browser includes a quick pick search provider menu that provides a user interface which provides a user with the ability to quickly select a new search provider which appears when the user places focus in the Web browser's search box. In one or more embodiments, the Web browser's search box comprises a native part of the Web browser and is not a search box associated with an installed tool bar. In yet other embodiments, the browser's search box functionality can be an extension to the Web browser that is not a native part of the Web browser. Further, various embodiments enable the user to switch between search providers in an easy and intuitive way.

Yet other embodiments provide an opportunity for users to switch between search providers using keywords in the search box. Further embodiments enable users to define collections of search providers to which individual searches can be sent.

In the discussion that follows, a section entitled "Operating Environment" is provided and describes one environment in which one or more embodiments can be employed. Following this, a section entitled "Quick Pick Search Provider Menu—Example" is provided and describes one example of a quick pick search provider menu. Next, a section entitled "Switching Search Providers via Tabs" describes one embodiment in which search providers can be represented by tabs. Following this, a section entitled "Defining Collections of Search Providers" describes how a user can define collections of search providers and then search across their collections in accordance with one or more embodiments. Next, a section entitled "Using Keywords to Select a Search Provider" describes how a user can use key words to select a particular search provider. Last, a section entitled "Example System" describes a system that can be utilized to implement one or more of the embodiments described herein.

Operating Environment

Figure 1:
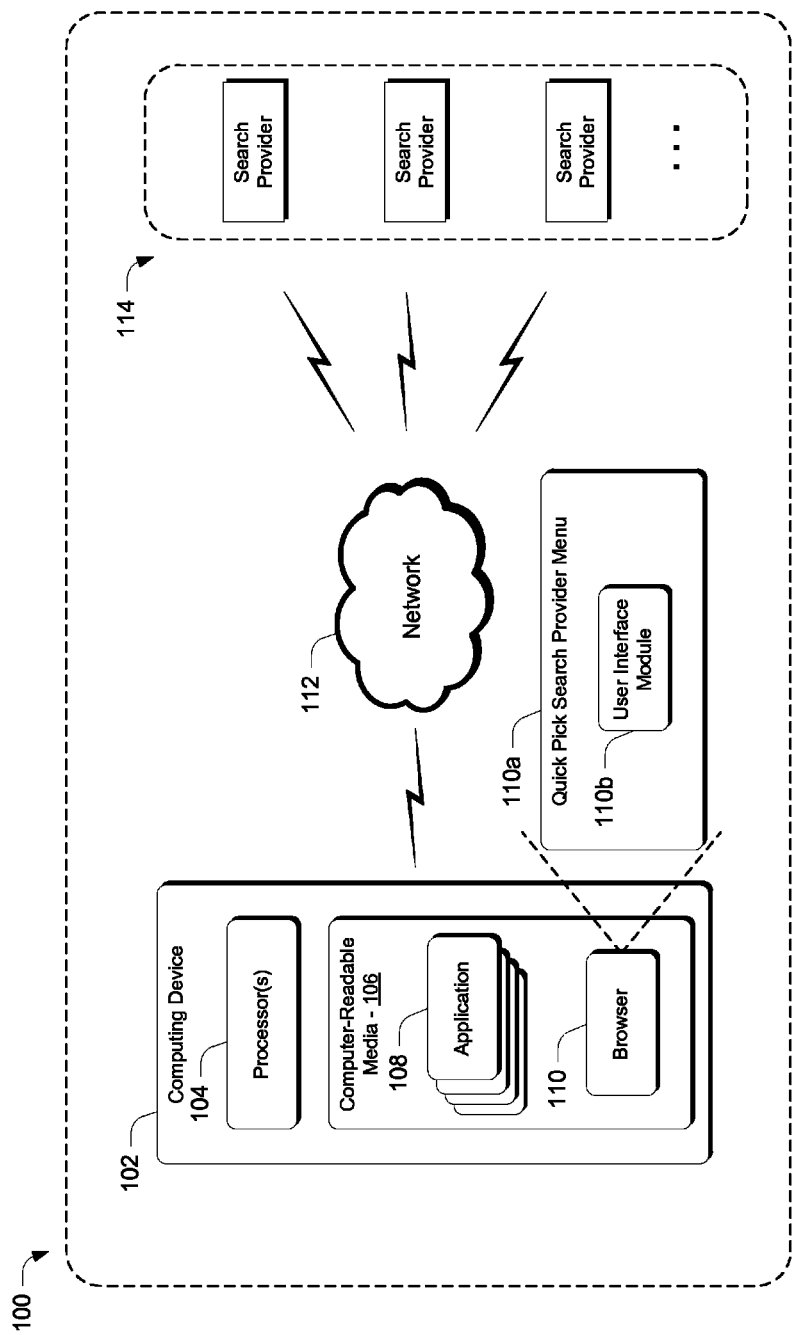
FIG. 1 illustrates a system in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 11.

In addition, computing device 102 includes a software application in the form of a Web browser 110. Any suitable Web browser can be used examples of which are available from the assignee of this document and others. In at least some embodiments, Web browser 110 is configured or configurable to provide a quick pick search provider menu that provides a user interface which provides a user with the ability to quickly select a new search provider which appears when the user places focus in the Web browser's search box. In one or more embodiments, the search box comprises a native part of the Web browser and not a search box associated with an installed tool bar. In yet other embodiments, search box functionality can be provided in the form of an extension to the Web browser. Further, various embodiments enable the user to switch between search providers in an easy and intuitive way. Yet other embodiments provide an opportunity for users to switch between search providers using keywords in the search box. Further embodiments enable users to define collections of search providers to which individual searches can be sent. To this end, Web browser 110 includes a quick pick search provider menu 110a having a user interface module 110b. Examples of various user interfaces provided by user interface module 110b and functionality provided by quick pick search provider menu 110a are provided below.

In addition, environment 100 includes a network 112, such as the Internet, and one or more search providers 114 from and to which content can be received and sent. The various search providers 114 can be installed in the Web browser's search box and utilized by the user as described below. Examples of search providers include, by way of example and not limitation, Google, Yahoo, Windows® Live, Wikipedia and others.

Computing device 102 can be embodied as any suitable computing device such as, by way of example and not limitation, a desktop computer, a portable computer, a handheld computer such as a personal digital assistant (PDA), cell phone, and the like.

In operation in at least some embodiments, the installed search providers are not initially displayed for the user. However, when the user places focus in the Web browser's search box, such as by clicking into the search box, a display of the installed search providers is provided. Any suitable display can be used. In at least some embodiments, search providers are represented by a search provider icon which is a website icon associated with a particular search provider. From there, the various functionalities described below can be accessed. For example, as a user enters their search text in the Web browser's search box, they can select a particular search provider by simply clicking on a search provider's icon. Thus, selection of a search provider or providers can occur directly in a user's work flow. This can avoid extra mouse clicks such as those that might be used to access a drop-down menu to then further access various search providers. In this manner, search providers can be automatically displayed for a user responsive to the user's placing focus in the Web browser's search box.

Quick Pick Search Provider Menu—Example

Figure 2:
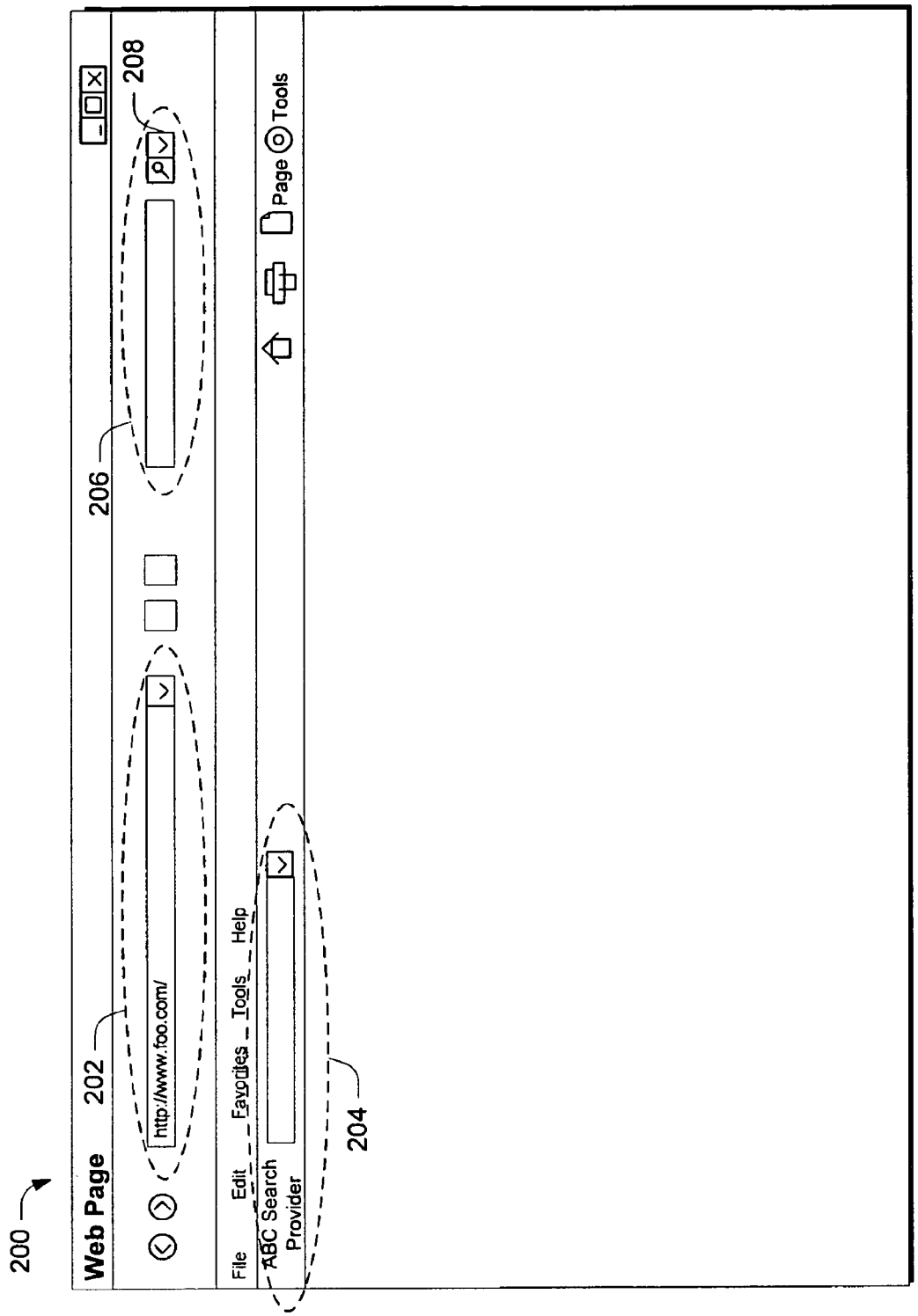
FIG. 2 illustrates an example user interface in accordance with one or more embodiments.

FIG. 2 illustrates an example user interface in the form of a Web browser user interface generally at 200. In this example, Web browser user interface 200 includes an address bar 202, a third-party search provider search box 204, and a browser-implemented search box 206 that can provide quick pick search provider menu functionality as described below. In one or more embodiments, search box 206 comprises a native part of the Web browser. In yet other embodiments, search box functionality can be provided in the form of an extension to the Web browser.

Figure 3:
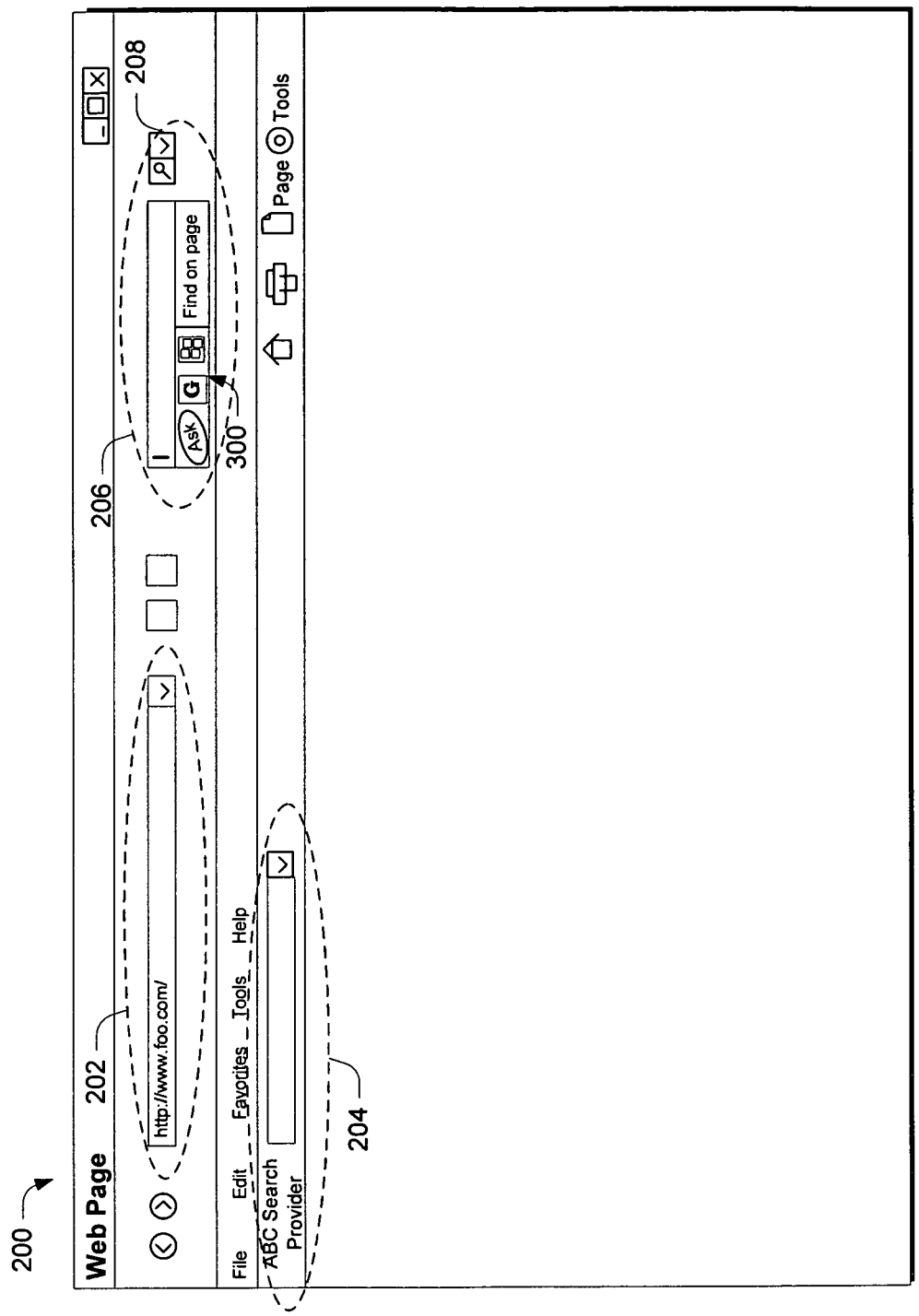
FIG. 3 illustrates an example user interface in accordance with one or more embodiments.

FIG. 3 illustrates an example quick pick search provider menu generally at 300. In the illustrated and described embodiment, the quick pick search provider menu is initially not presented to the user as shown in FIG. 2. However, when the user places focus in the search box 206, as indicated by the presence of a cursor, the quick pick search provider menu 300 is presented for the user. In the illustrated and described embodiment, the quick pick search provider menu 300 includes one or more search provider icons that represent various search providers that have been installed in the browser. This is shown in more detail in FIG. 4.

Figure 4:
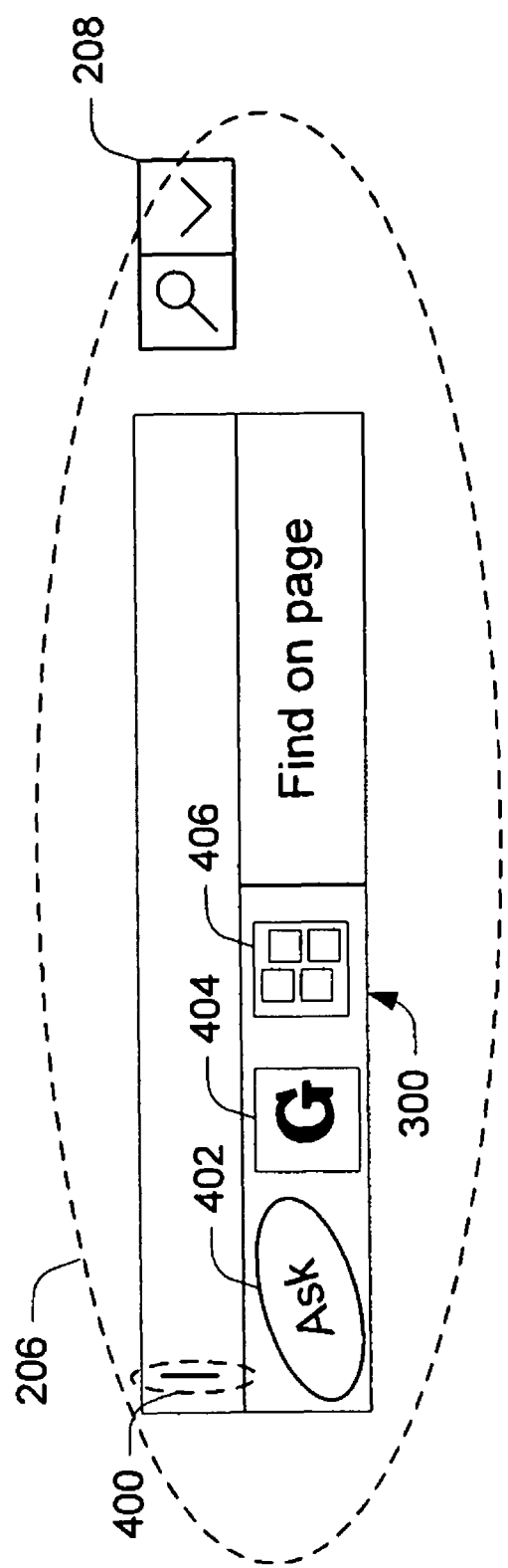
FIG. 4 illustrates an example user interface in accordance with one or more embodiments.

FIG. 4 is an enlarged view of search box 206 and quick pick search provider menu 300. Here, the user has placed focus in the search box by placing their cursor in the search box. This is indicated by the cursor representation shown at 400. Notice in this example that a number of search provider icons are illustrated in the quick pick search provider menu. Specifically, search provider icons are illustrated at 402, 404, and 406. Each of these search provider icons is associated with a different search provider that has been installed by the user. Accordingly, when the user places focus in the search box, the search provider icons of the installed search providers are automatically displayed. In one or more embodiments, using search provider icons or other abbreviated representations of a search provider serve to conserve space in the browser's user interface while, at the same time, provide a quick reminder to the user of the different search providers that they have installed.

In at least some embodiments, a user can enter their search text in search box 206 and can then select a particular search provider icon to have their search executed by the corresponding search provider. The search can be executed in any suitable way. For example, in at least some embodiments, searches are executed using an OpenSearch description file that is provided by the search providers. An OpenSearch description file describes a particular search engine in a manner that enables search client applications to use it. OpenSearch techniques are known and, for the sake of brevity, are not described in detail here.

Alternately or additionally, a user can place focus in search box 206 and can then select a particular search provider icon. Once the search provider icon has been selected, the user can then enter their search text to have their search executed by the corresponding search provider.

Figure 5:
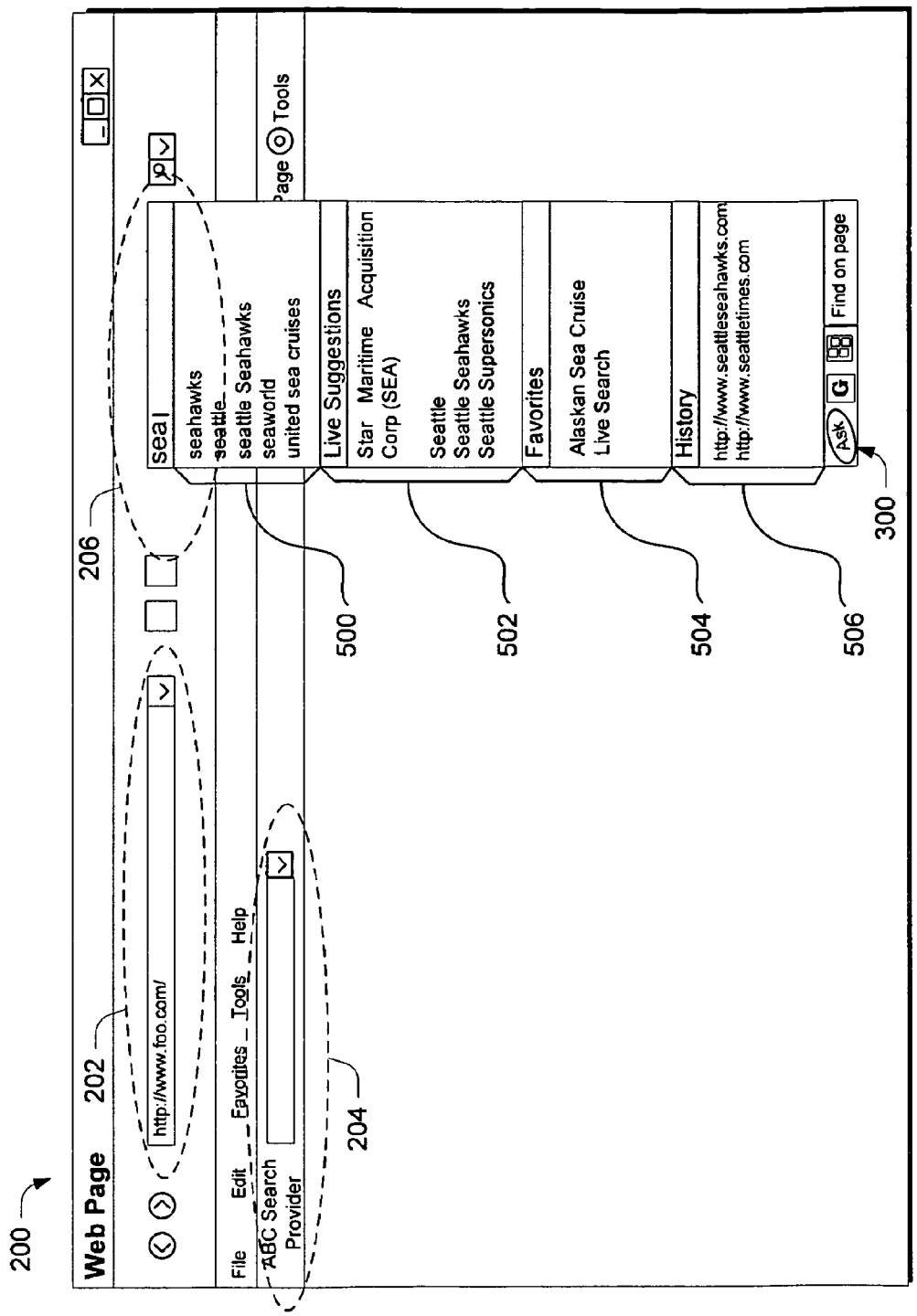
FIG. 5 illustrates an example user interface in accordance with one or more embodiments.

In one or more embodiments, the quick pick search provider menu 300 can operate in other ways to enhance the user's search experience. For example, as a user enters their search text, the quick pick search provider menu can be expanded to include other information that is of potential interest to the user. By way of example and not limitation, such other information can include auto-complete suggestions, suggestions received from one or more search providers, matching favorites, and/or matching history. As an example, consider FIG. 5.

There, a user has begun to enter the search text "sea". Responsive to the entered text, the quick pick search provider menu 300 expands as shown to include a number of different sections. In this particular example, the sections include, by way of example and not limitation, an auto-complete section 500, a search provider suggestion section 502, a favorites section 504 and a history section 506. In this example, suggestions that are populated in the auto-complete section 500 are locally maintained on the client device. Likewise, suggestions for the favorites and history sections are also locally maintained. In this particular example, however, suggestions that are provided in the search provider suggestions section 502 are received from an associated search provider. Specifically, as a user enters their search text, the Web browser communicates the search text to a particular search provider. The search provider can then use the received search text to provide suggestions that can be populated in the search provider suggestions section 502.

In one or more embodiments, a user may opt to not select a particular search provider when entering their search text. In this case, a default behavior is to use the last-used search provider in order to provide suggestions in the search provider suggestions section 502. Alternately or additionally, a default behavior can be to provide suggestions from multiple different search providers. In this case, the search provider suggestions section 502 might be divided into a corresponding number of subsections so that suggestions from multiple different search providers can be displayed. Alternately or additionally, as a user enters their search text they may opt to click on or otherwise select a particular search provider. In this case, suggestions that are displayed in the search provider suggestions section 502 would be those suggestions that are received from the selected search provider.

Figure 6:
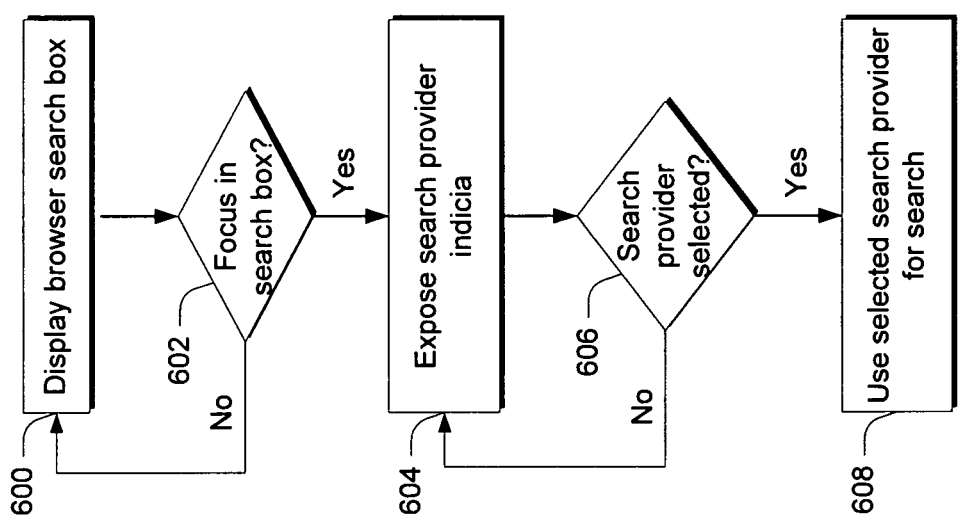
FIG. 6 is a flow diagram that describes steps in a method in accordance with one or more embodiments.

FIG. 6 is a flow diagram that describes steps in a method in accordance with one or more embodiments. The method can be performed in connection with any suitable hardware, software, firmware, or combination thereof. In at least some embodiments, the method can be implemented by a suitably-configured Web browser.

Step 600 displays a browser search box. In one or more embodiments, the browser search box is provided as part of a Web browser's overall user interface-either as a native part of the Web browser or an extension to the Web browser. An example of such a browser search box is provided above and below. Step 602 ascertains whether a user has placed focus in the search box. If the user has not placed focus in the search box, the method returns to step 600. If, on the other hand, the user has placed focus in the search box, step 604 exposes search provider indicia for the user. Any suitable search provider indicia can be used. For example, in one or more embodiments, search provider indicia in the form of search provider icons can be utilized. In one or more embodiments, the search provider indicia can be exposed automatically as soon as the user places focus in the search box. Additionally, in one or more embodiments, this step can be performed independent of a user accessing a drop-down menu button associated with the search box.

Step 606 ascertains whether a search provider has been selected. A search provider can be selected in any suitable way. For example, a search provider can be selected by clicking on a particular displayed indicia associated with the search provider. If the user has not selected a search provider, the method returns to step 604. If, on the other hand, the user has selected a particular search provider, then step 608 uses the selected search provider for a search. For example, a user may enter search text in the search box and then select a particular search provider. In this case, search provider selection takes place after the user enters their search text. Alternately or additionally, a user may select a particular search provider and then enter their particular search text. In this case, search provider selection takes place prior to a user entering search text.

In addition, it is to be appreciated and understood that execution of a particular search in step 608 can be performed for an entire or complete search text or for portions of a search text. An example of the latter is given above in the form of searches that are conducted to provide suggestions for the user as they enter their search text.

Switching Search Providers Via Tabs

Figure 7:
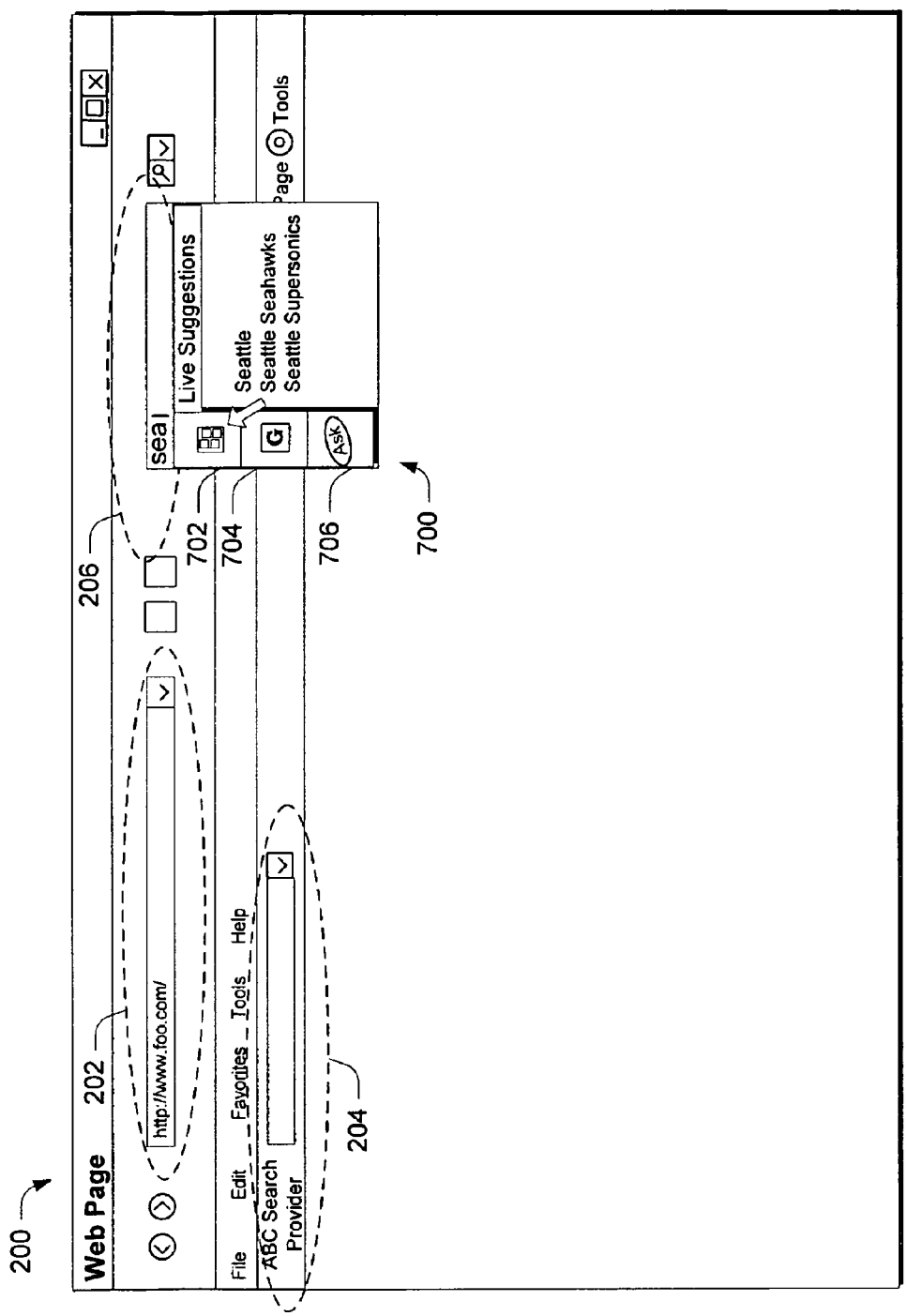
FIG. 7 illustrates an example user interface in accordance with one or more embodiments.

In one or more embodiments, a quick pick search provider menu can provide indicia associated with individual installed search providers in the form of tabs, individual ones of which are associated with a particular search provider or collection of search providers. When a user wishes to switch search providers, they can simply select a tab associated with a particular search provider or collection of search providers. As an example, consider FIG. 7. There, a Web browser user interface 200 is illustrated having a quick pick search provider menu in accordance with one embodiment generally at 700. In this example, three different search providers are illustrated as having tabs at 702, 704, and 706. Here, the user has selected tab 702 to have suggestions by the associated search provider displayed for them. As in the above example, suggestions can be provided for partial search texts such as in the figure or for entire or complete search texts. In this embodiment and the embodiments described above, suggestions or search results can be displayed within the quick pick search provider menu. Alternately or additionally, a user can be navigated to a particular search provider's results page. Navigation to a particular search provider's results page can occur, for example, when a user completes entry of their search text and presses the "Enter" key.

In one or more embodiments, suggestions or results can be displayed for multiple different search providers. For example, a user might select tabs associated with two or more search providers. In this case, the quick pick search provider menu might have a split display in which the suggestions or results for the selected search providers are displayed.

Figure 8:
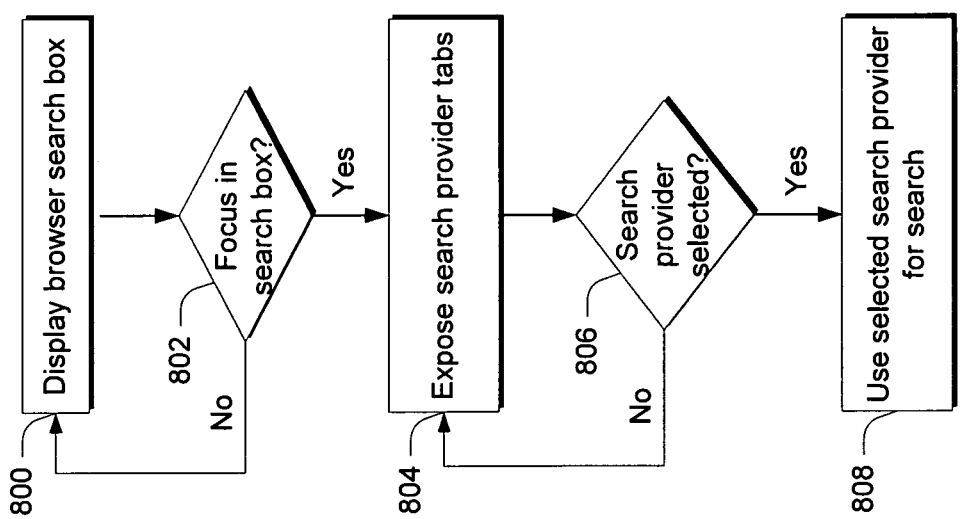
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be implemented by a suitably-configured Web browser.

Step 800 displays a browser search box. In one or more embodiments, the browser search box is provided as part of a Web browser's overall user interface. An example of such a browser search box is provided above. Step 802 ascertains whether a user has placed focus in the search box. If the user has not placed focus in the search box, the method returns to step 800. If, on the other hand, the user has placed focus in the search box, step 804 exposes search provider tabs for the user. The tabs can include, in at least some embodiments, search provider icons associated with the individual search providers. In one or more embodiments, the search provider tabs can be exposed automatically as soon as the user places focus in the search box. Additionally, in one or more embodiments, this step can be performed independent of a user accessing a drop-down menu button associated with the search box.

Step 806 ascertains whether a search provider has been selected. A search provider can be selected by clicking on one or more tabs associated with one or more search providers. If the user has not selected a search provider, the method returns to step 804. If, on the other hand, the user has selected a particular search provider, then step 808 uses the selected search provider for a search. For example, a user may enter search text in the search box and then select a particular search provider. In this case, search provider selection takes place after the user enters their search text. Alternately or additionally, a user may select a particular search provider and then enter their particular search text. In this case, search provider selection takes place prior to a user entering search text.

In addition, it is to be appreciated and understood that execution of a particular search in step 808 can be performed for an entire or complete search text or for portions of a search text. An example of the latter is given above in the form of searches that are conducted to provide suggestions for the user as they enter their search text.

Defining Collections of Search Providers

Figure 9:
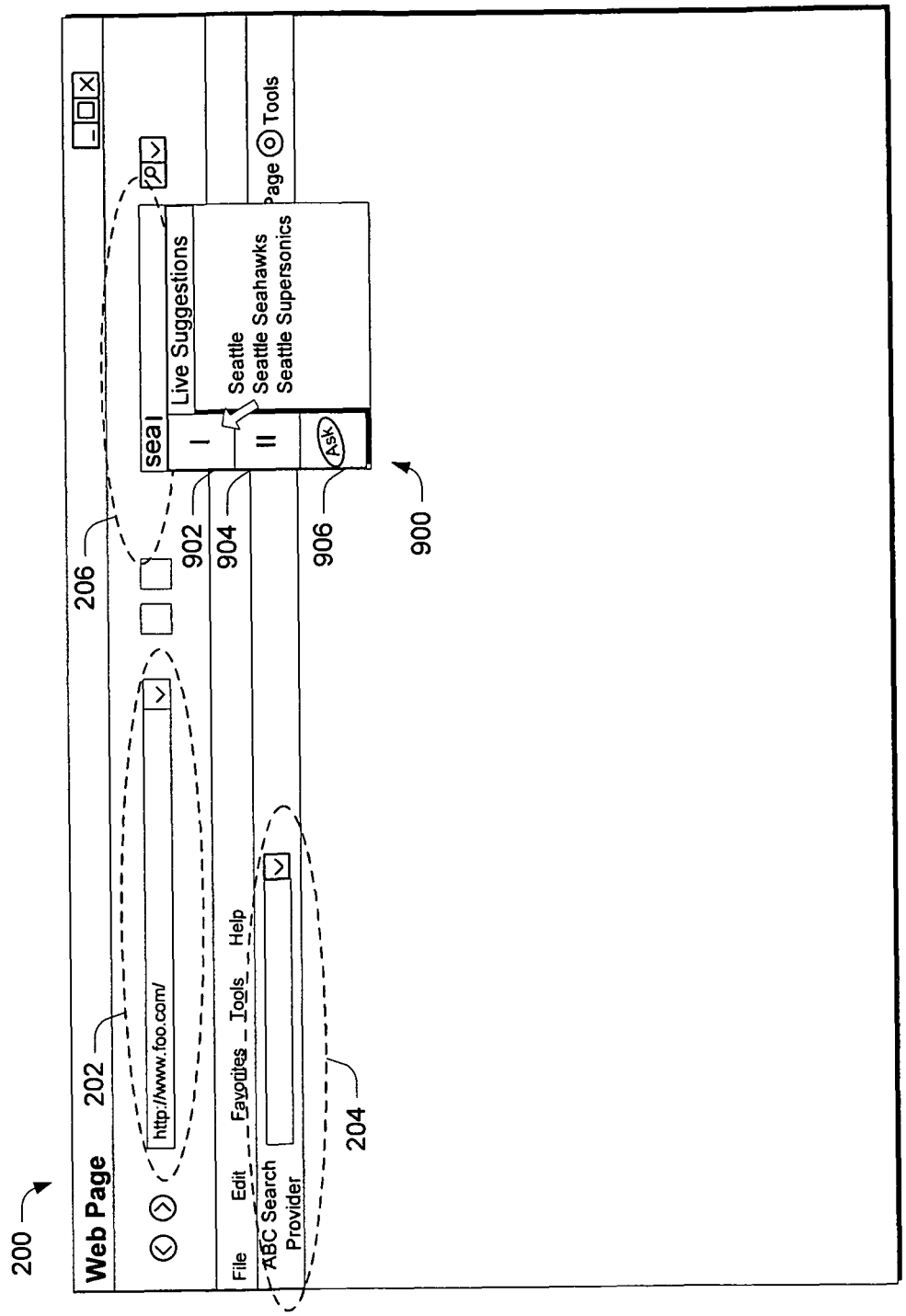
FIG. 9 illustrates an example user interface in accordance with one or more embodiments.

In one or more embodiments, a user can define a collection of search providers that can be displayed for them using the indicia described above. For example, a user might indicate a preference for two search providers by placing them into a collection. The collection is then represented by indicia which can be selected by the user. The indicia can take any suitable form such as those forms that are described above. As an example, consider FIG. 9. There, a Web browser user interface is illustrated generally at 200. In this example, a quick pick search provider menu 900 includes multiple tabs 902, 904, and 906. In this particular example, tabs 902 and 904 represent collections of the search providers, i.e. Collection I and Collection II, respectively. So for example, Collection I might include two search providers and Collection II might include two different search providers. In this manner, by selecting indicia associated with the particular collection, the user can receive suggestions and/or results associated with multiple different search providers.

In one or more embodiments, if a user issues a search to a collection of search providers, multiple different tabs associated with the search providers can be opened up in the quick pick search provider menu. Now, by clicking on a particular tab, search results associated with a corresponding search provider can be displayed. The user can switch between search providers by simply clicking on an associated tab.

Alternately or additionally, the results can be presented in any suitable way such as by split screening the browser user interface, by presenting the search results for the search providers within the quick pick search provider menu and/or by opening different browser tabs to the search providers' results page.

Figure 10:
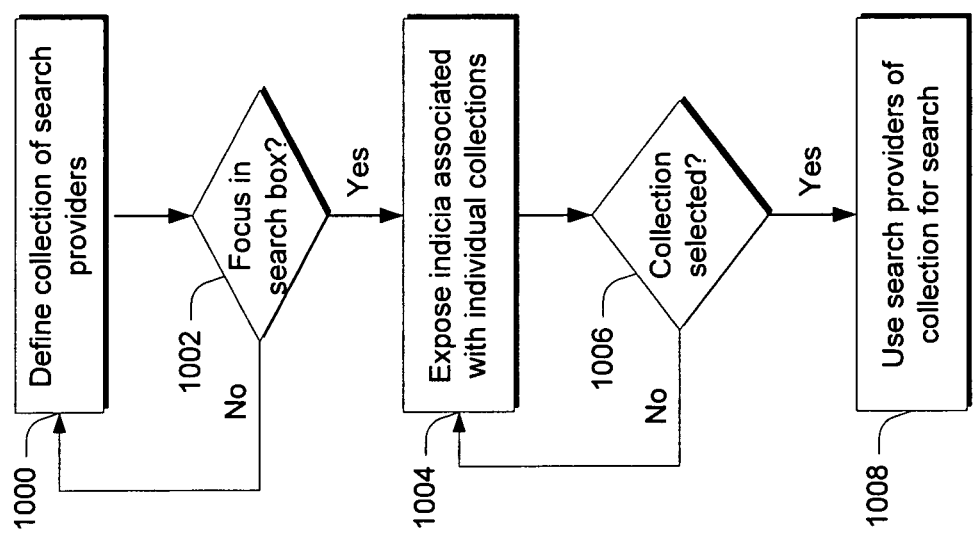
FIG. 10 is a flow diagram that describes steps in a method in accordance with one or more embodiments.

FIG. 10 is a flow diagram that describes steps in a method in accordance with one or more embodiments. The method can be performed in connection with any suitable hardware, software, firmware, or combination thereof. In at least some embodiments, the method can be implemented by a suitably-configured Web browser.

Step 1000 defines a collection of search providers. The step can be performed in any suitable way. For example, a user interface feature can be presented to a user to enable them to define and group search providers into a collection. Step 1002 ascertains whether a user has placed focus in the Web browser's search box. If the user has not placed focus in the search box, the method returns to step 1000. If, on the other hand, the user has placed focus in the search box, step 1004 exposes indicia associated with individual collections defined by the user. Step 1006 ascertains whether a collection has been selected. If a collection has not been selected, the method returns to step 1004. If, on the other hand, a collection has been selected, step 1008 uses search providers of the collection for a search. As in the above example, the search can be conducted to ascertain suggestions that can be presented to the user responsive to a user entering a partial text string. Alternately or additionally, the search can be conducted to present search results for an entire or completed search text entered by the user.

Using Keywords to Select a Search Provider

In one or more embodiments, a user can use key words in the browser's search box to select a particular search provider. For example, a user might enter the following text string to indicate that they wish to have their search performed by the Google search provider: "g:seattle". In this example, the "g" designation indicates a shorthand notation for the Google search provider. This functionality can be provided by itself or in combination with any of the embodiments described above.

Example System

Figure 11:
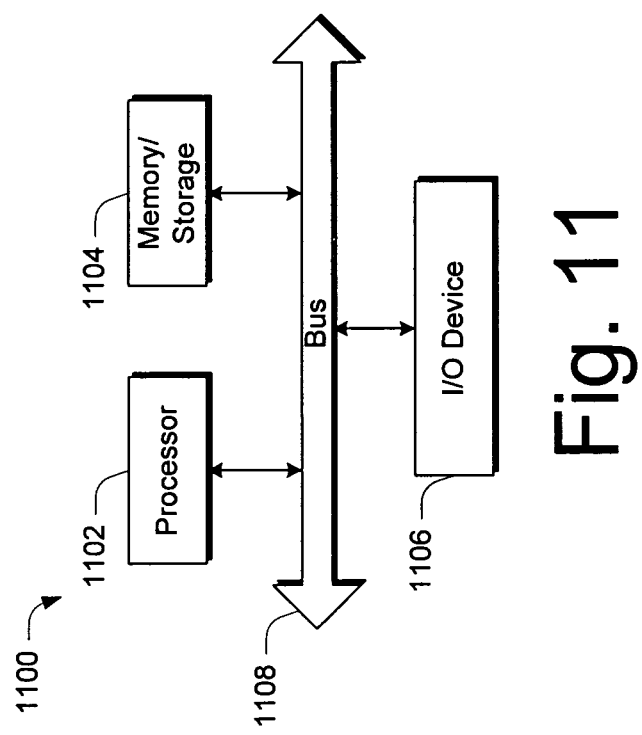
FIG. 11 illustrates an example system that can be used to implement one or more embodiments.

FIG. 11 illustrates an example computing device 1100 that can implement the various embodiments described above. Computing device 1100 can be, for example, computing device 102 of FIG. 1 or any other suitable computing device.

Computing device 1100 includes one or more processors or processing units 1102, one or more memory and/or storage components 1104, one or more input/output (I/O) devices 1106, and a bus 1108 that allows the various components and devices to communicate with one another. Bus 1108 represents one or more of any of several types of bus structures, including a memory bus or memory controller, a peripheral bus, an accelerated graphics port, and a processor or local bus using any of a variety of bus architectures. Bus 1108 can include wired and/or wireless buses.

Memory/storage component 1104 represents one or more computer storage media. Component 1104 can include volatile media (such as random access memory (RAM)) and/or nonvolatile media (such as read only memory (ROM), Flash memory, optical disks, magnetic disks, and so forth). Component 1104 can include fixed media (e.g., RAM, ROM, a fixed hard drive, etc.) as well as removable media (e.g., a Flash memory drive, a removable hard drive, an optical disk, and so forth).

One or more input/output devices 1106 allow a user to enter commands and information to computing device 1100, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

In the embodiments described above, a Web browser includes a quick pick search provider menu that provides a user interface which provides a user with the ability to quickly select a new search provider which appears when the user places focus in the Web browser's search box. In one or more embodiments, the Web browser's search box comprises a native part of the Web browser and is not a search box associated with an installed tool bar. Further, various embodiments enable the user to switch between search providers in an easy and intuitive way. Yet other embodiments provide an opportunity for users to switch between search providers using keywords in the search box. Further embodiments enable users to define collections of search providers to which individual searches can be sent. By enabling a user to switch between search providers in an easy and intuitive way, the user's searching experience is enhanced and efficiencies are improved.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more computer readable storage media;
computer-readable instructions embodied on the one or more computer readable storage media which, when executed, provide a Web browser configured to:
provide a search box configured to accept one or more text entries associated with a search; and
provide a quick pick search provider menu that provides a user interface that enables a user to select a search provider from multiple installed search providers, a representation of each search provider of the multiple installed search providers configured to automatically appear when the user places focus in the search box, the user interface further configured to enable the user to select a collection of more than one search provider via selection of an associated search provider collection icon.

2. The system of claim 1, wherein the Web browser is configured to further enable a user to switch between search providers using key words in the search box.

3. The system of claim 1, wherein the Web browser is further configured to enable a user to define multiple, user-switchable collections of search providers to which individual searches can be sent.

4. The system of claim 1, wherein at least one representation of a search provider that automatically appears is an icon associated with said search provider.

5. The system of claim 1, wherein at least one representation of a search provider that automatically appears is a tab associated with said search provider.

6. The system of claim 1, wherein the Web browser is further configured to enable the quick pick search provider menu to provide suggestions received from one or more search providers.

7. The system of claim 6, wherein the quick pick search provider menu is expandable to include different sections, individual ones of which can display suggestions for the user as the user enters search text.

8. A computer-implemented method comprising:
displaying a Web browser search box;
ascertaining whether a user has placed focus in the search box;
responsive to ascertaining a user has placed focus in the search box, displaying search provider indicia that can be selected by the user and displaying at least one search provider collection indicia, wherein said at least one search provider collection indicia is associated with a collection of more than one search provider;
ascertaining whether search provider indicia has been selected by a user;
responsive to ascertaining a user has selected search provider indicia, using a selected search provider for a search; and
enabling a user, via selection of the at least one search provider collection indicia, to switch from a single search provider to a collection of search providers, the search provider collection indicia further configured to enable submitting a search term, entered in the Web browser search box, to each of the more than one search provider in the collection responsive to selection of the search provider collection indicia.

9. The method of claim 8, wherein the search provider indicia comprises one or more search provider icons, individual search provider icons being associated with individual respective search providers.

10. The method of claim 8, wherein the search provider indicia comprises one or more tabs, individual tabs being associated with individual respective search providers.

11. The method of claim 8, wherein said displaying search provider indicia is performed independent of a user accessing a drop-down menu button associated with the search box.

12. The method of claim 8, wherein search provider indicia selection can take place after a user enters search text.

13. The method of claim 8, wherein search provider indicia selection can take place prior to a user entering search text.

14. The method of claim 8, wherein said search can comprise a search for suggestions associated with portions of search text entered by a user.

15. The method of claim 8, wherein said search can be performed across multiple search providers.

16. One or more computer readable storage media comprising computer-readable instructions which, when executed, implement a method comprising:
enabling a user to define and group multiple search providers into multiple collections;
ascertaining whether the user has placed focus in a Web browser's search box, wherein the search box is a native part of the Web browser; and
responsive to the user placing focus in the Web browser's search box, displaying a plurality of collection indicia, each collection indicia being a singular displayed representation of an individual collection of search providers defined by the user, at least one collection of search providers comprising multiple search providers, the indicia being configured to enable the user to selectably switch between individual collections of search providers.

17. The one or more computer readable storage media of claim 16, wherein the method further comprises ascertaining whether a collection has been selected by the user and, responsive to a collection being selected by the user, using search providers of the collection for a search.

18. The one or more computer readable storage media of claim 16, wherein said search comprises one or more of a search for suggestions for a partial text string or a search for search results for completed search text.

19. The one or more computer readable storage media of claim 16, wherein said indicia comprises one or more tabs associated with one or more respective collections of search providers.

20. The computer-implemented method of claim 8 further comprising enabling display of at least one search provider indicia at a same time as at least one search provider collection indicia.

* * * * *